(12) United States Patent
Kasai et al.

(10) Patent No.: US 11,991,326 B2
(45) Date of Patent: May 21, 2024

(54) IMAGE READING DEVICE WITH DOCUMENT PRESSING SECTION

(71) Applicant: SEIKO EPSON CORPORATION, Tokyo (JP)

(72) Inventors: Tsuneo Kasai, Nagano (JP); Ryo Yamaguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/150,218

(22) Filed: Jan. 5, 2023

(65) Prior Publication Data
US 2023/0224417 A1    Jul. 13, 2023

(30) Foreign Application Priority Data

Jan. 7, 2022    (JP) .................................. 2022-001474

(51) Int. Cl.
*H04N 1/04*    (2006.01)
*H04N 1/00*    (2006.01)

(52) U.S. Cl.
CPC .............................. *H04N 1/00806* (2013.01)

(58) Field of Classification Search
CPC ............ H04N 1/00806; H04N 1/1225; H04N 2201/0098
USPC ......... 358/474, 449; 399/369, 377, 370, 379
See application file for complete search history.

(56) References Cited

U.S. PATENT DOCUMENTS

| 6,697,600 B2* | 2/2004 | Nishikino | G03G 15/605 |
| | | | 399/380 |
| 2006/0226595 A1* | 10/2006 | Yamamoto | B65H 1/027 |
| | | | 271/162 |
| 2015/0381837 A1* | 12/2015 | Oizumi | H04N 1/00559 |
| | | | 358/474 |

FOREIGN PATENT DOCUMENTS

JP    2016-012829 A    1/2016

* cited by examiner

*Primary Examiner* — Jamares Q Washington
(74) *Attorney, Agent, or Firm* — Global IP Counselors, LLP

(57) ABSTRACT

There is provided a flat head type image reading device configured to scan a standard size document including an A4 size, the image reading device including: a document pressing section pressing the standard size document and made of an elastic member, in which the document pressing section has fixing members, and the fixing members are arranged at positions corresponding to end portions of the standard size document.

6 Claims, 9 Drawing Sheets

IMAGE READING DEVICE WITH DOCUMENT PRESSING SECTION

The present application is based on, and claims priority from JP Application Ser. No. 2022-001474, filed Jan. 7, 2022, the disclosure of which is hereby incorporated by reference herein in its entirety.

BACKGROUND

1. Technical Field

The present disclosure relates to an image reading device.

2. Related Art

A scanner as an image reading device, particularly a so-called flatbed type scanner that reads a document while a reading sensor moves under a document platen glass is known. In the image reading device disclosed in JP-A-2016-12829, a document pressing section for pressing a document placed on a document platen is arranged to abut against the entire document platen.

However, in the image reading device described in JP-A-2016-12829, when a standard size document such as A3 or A4 is placed on the document platen in order to read the document, the standard size document is different in size from the document platen. Therefore, there is a problem that the entire standard size document cannot be reliably pressed against the document platen, and the quality of image reading deteriorates.

SUMMARY

According to an aspect of the present disclosure, there is provided a flat head type image reading device configured to scan a standard size document including an A4 size, the image reading device including: a document pressing section pressing the standard size document and made of an elastic member, in which the document pressing section has fixing members, and the fixing members are arranged at positions corresponding to end portions of the standard size document.

DESCRIPTION OF EXEMPLARY EMBODIMENTS

Figure 1:
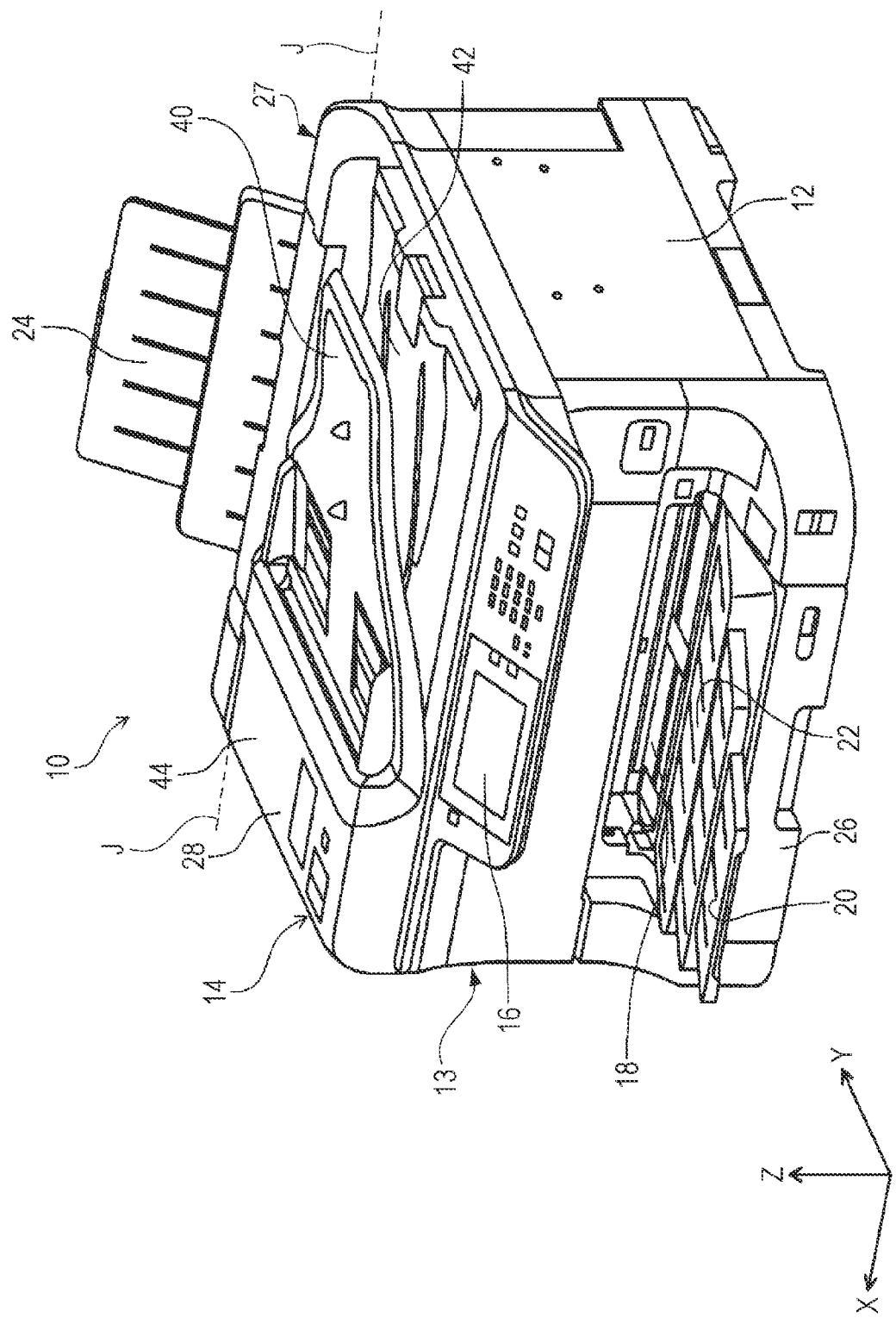
FIG. 1 is an external perspective view of a multifunction machine.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. Moreover, not all of the configurations which will be described below are necessarily essential components of the present disclosure.

1. Present Embodiment

A multifunction machine 10 according to an embodiment will be described with reference to FIG. 1. FIG. 1 is an external perspective view of the multifunction machine 10 according to Embodiment 1.

The multifunction machine 10 includes an apparatus main body 12 having a substantially rectangular parallelepiped shape as a whole. The apparatus main body 12 includes a recording device 13 that performs recording on paper, which is an example of a medium to be recorded, and an image reading device 14 that is provided on the recording device 13 and capable of reading a document or the like. For example, an image read by the image reading device 14 is printed on a medium by the recording device 13. In the XYZ coordinate system, the X direction is the document transport direction in the image reading device 14, the Y direction is the document width direction, and the Z direction is the height direction of the image reading device 14.

The image reading device 14 includes an auto document feeder (ADF) section 27 which is an automatic document feeding device. The ADF section 27 is turnably provided with the rear surface side, which is the +Y-axis direction side, of the apparatus main body 12, as a fulcrum of a turning axis J, and is configured as an opening/closing body that can be opened and closed with respect to the upper portion of the apparatus main body 12.

The ADF section 27 includes a document transport section 28 having a drive mechanism for transporting documents, a document placement surface 40, and a document discharge surface 42. The document placed on the document placement surface 40 is fed into the image reading device 14 by the document transport section 28, read, and then discharged and placed on the document discharge surface 42. Note that an example of a document in the present embodiment is a photograph, a document, or the like.

An operation section 16 is provided at the upper portion of the front surface side of the apparatus main body 12 in the −Y-axis direction, and the operation section 16 includes a power button, a print setting button, a display panel, and the like for operating the multifunction machine 10.

A rear tray 24 on which paper is placed is provided on the rear surface side, which is the +Y-axis direction side, of the apparatus main body 12. The paper placed on the rear tray 24 is fed to a recording section 135 in the recording device 13 illustrated in FIG. 2 and recorded.

A paper accommodation section 26 for accommodating a plurality of paper sheets is provided on the bottom surface side, which is the −Z-axis direction side, of the front tray 22. The paper accommodation section 26 is slidably provided at the lower portion of the apparatus main body 12 in the Y-axis direction, and is detachably attached to the apparatus main body 12. The paper placed in the paper accommodation section 26 is fed to the recording section 135 in the recording device 13 and recorded.

On the front surface side of the apparatus main body 12, a drawer section 20 which is attached to a front tray 22 and is slidable in the Y-axis direction is provided. The paper fed from the rear tray 24 or the paper accommodation section 26 to the recording section 135 and recorded is discharged from an opening portion 18 provided on the front surface side of the apparatus main body 12, and is placed on the front tray 22 and the drawer section 20 in a state of being drawn out of the front tray 22.

The multifunction machine 10 of the present embodiment can feed the paper placed on the front tray 22 and the drawer section 20 into the recording device 13 through the opening portion 18 and perform recording by the recording section 135. Therefore, the front tray 22 and the drawer section 20 function as a support surface for paper discharged from the inside of the recording device 13 to the outside, and function as a support surface for paper fed into the recording device 13.

Figure 2:
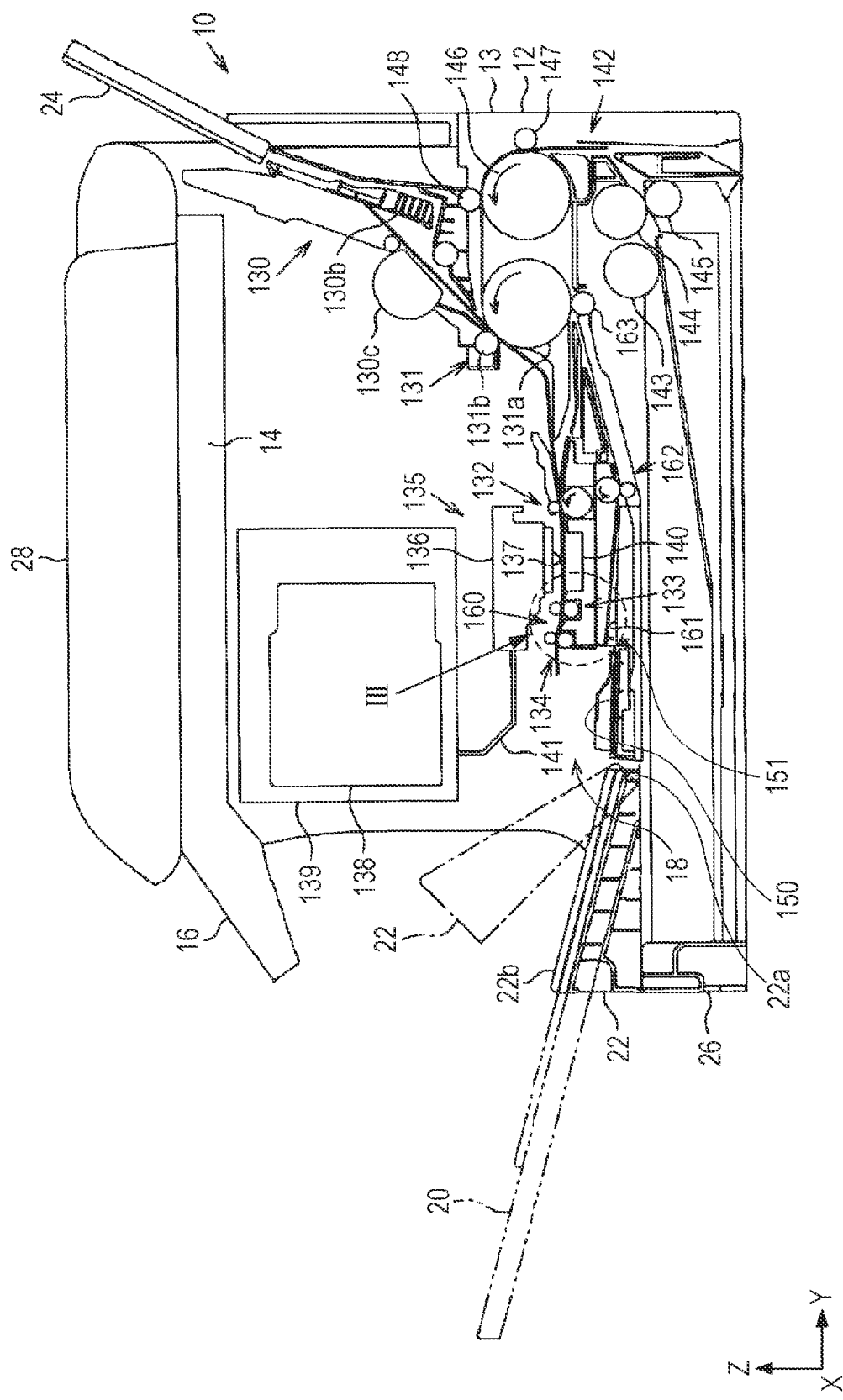
FIG. 2 is a side sectional view for describing a schematic configuration of a recording device.

Next, a schematic configuration of the recording device 13 will be described with reference to FIG. 2. FIG. 2 is a side sectional view for explaining a schematic configuration of the recording device 13 arranged on the bottom surface side of the image reading device 14 in the −Z-axis direction.

The front tray 22 has an upper surface 22b on which paper is placed, and is turnably provided with a shaft 22a extending in the X-axis direction as a fulcrum, as indicated by a dot dash line. As described above, the front tray 22 is provided with the drawer section 20 illustrated by the two-dot dash line that can be drawn out to the front surface side.

A feeding section 130 for feeding paper is provided at the upper rear portion of the recording device 13. The feeding section 130 includes a rear tray 24 on which paper is placed, a hopper 130b, and a feeding roller 130c. The paper placed on the rear tray 24 is pressed against the feeding roller 130c by the operation of the hopper 130b, and is sent out toward the downstream of the transport path by the rotation of the feeding roller 130c.

In the recording device 13, transport roller pairs 131 and 132 and discharge roller pairs 133 and 134 for transporting the paper from the feeding section 130 toward the front tray 22 are arranged along the transport path. The recording section 135 for performing recording on paper is arranged at a position between the transport roller pair 132 and the discharge roller pair 133.

The recording section 135 includes a carriage 136 that can reciprocate in the main scanning direction, which is the X-axis direction, and a recording head 137 provided below the carriage 136.

A cartridge holder 139 to which an ink cartridge 138 accommodating ink is detachably mounted is arranged above the recording section 135 in the recording device 13 in the +Z-axis direction. The recording section 135 also includes a support section 140 that supports the paper at a lower position facing the movement area of the recording head 137. The recording head 137 ejects the ink supplied from the ink cartridge 138 through the tube 141 onto the paper supported by the support section 140, thereby forming an image on the paper.

A discharge/transport path 160 is formed as a path along which the paper recorded by the recording head 137 is transported at the downstream in the transport direction, which is the −Y-axis direction of the paper, from the support section 140. The discharge/transport path 160 is a transport path for paper transported by the discharge roller pairs 133 and 134. A placement surface 150 that serves as an inner wall portion on the lower side of the opening portion 18 is provided at the downstream of the discharge/transport path 160 in the transport direction. The rear end side of the paper discharged from the discharge/transport path 160 is placed on the placement surface 150.

A supply section 142 that sends out the paper sheets accommodated in the paper accommodation section 26 one by one to the feeding path toward the recording section 135 is provided at the lower rear portion of the recording device 13 in the +Y-axis direction. The supply section 142 includes a pickup roller 143 that comes into contact with the uppermost sheet among the plurality of paper sheets in the paper accommodation section 26, a separation roller 144, and a retard roller 145 paired with the separation roller 144.

The supply section 142 includes an intermediate roller 146 arranged on the rear side of the transport roller pair 131 and two driven rollers 147 and 148 that sandwich the paper with the intermediate roller 146. The transport roller pair 131 includes an intermediate roller 131a rotationally driven in conjunction with the intermediate roller 146, and a driven roller 131b paired with the intermediate roller 131a.

When the pickup roller 143, the separation roller 144, and the intermediate rollers 146 and 131a are rotated counterclockwise in FIG. 2 by the power of the motor (not illustrated) provided in the apparatus main body 12, the paper sheets accommodated in the paper accommodation section 26 are fed one by one to the recording section 135 via the transport roller pairs 131 and 132.

A feed/transport path 161 along which the paper is fed to the rear surface side in the +Y-axis direction from the front surface side is formed on the bottom surface side of the discharge/transport path 160 in the -Z-axis direction. A transport roller pair 162 that transports the paper toward the intermediate roller 131a on the rear surface side is disposed in the feed/transport path 161, and a driven roller 163 that sandwiches the paper with the intermediate roller 131a is provided below the intermediate roller 131a.

The paper inserted into the feed/transport path 161 from the opening portion 18 is transported to the rear surface side by the transport roller pair 162, the intermediate roller 131a, and the driven roller 163, is reversed by the intermediate roller 146 and the driven rollers 147 and 148, is transported to the recording section 135 by the intermediate roller 131a, the driven roller 131b, and the transport roller pair 132, and is recorded.

Figure 3:
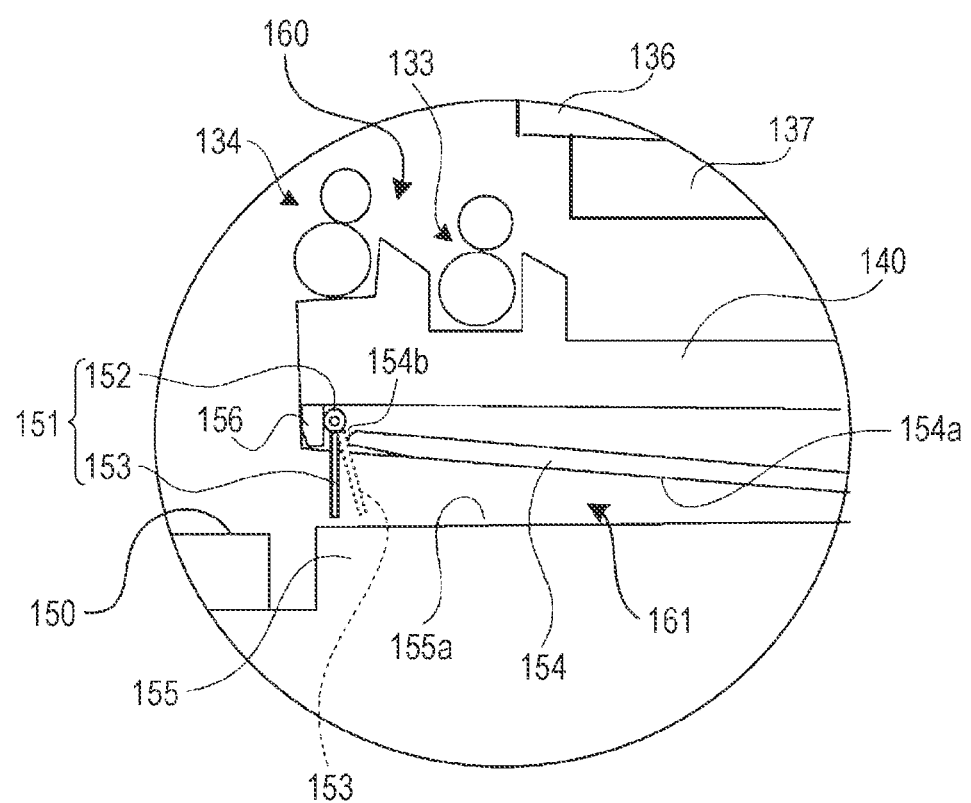
FIG. 3 is an enlarged view of a part provided with a restriction member in FIG. 2.

FIG. 3 is a view viewed from the X-axis direction, and is an enlarged view of a part (inside the circle indicated by the dashed line A) provided with the restriction member 151 in FIG. 2. The feed/transport path 161 is a transport path in which a guide surface 154a of an upper wall portion 154 and a guide surface 155a of a lower wall portion 155 face each other and are provided between the guide surface 154a and the guide surface 155a. The distance of the gap in the height direction between the guide surface 155a and the guide surface 154a is formed to become narrower toward the rear side.

The restriction member 151 has a swing shaft 152 and a swing member 153 that can swing with the swing shaft 152 as a fulcrum. The swing member 153 may be a plate-shaped member extending in the X-axis direction, or may be configured such that a plurality of rod-shaped members protruding downward from the swing shaft 152 are arranged side by side in the X-axis direction.

A front wall portion 156 protruding downward from the support section 140 is provided on the front side of the restriction member 151, and a front end portion 154b of the upper wall portion 154 is arranged on the rear surface side of the restriction member 151. Therefore, in the range in which the restriction member 151 swings with the swing shaft 152 as a fulcrum, as indicated by a solid line, the swing member 153 abuts against the front wall portion 156, and accordingly, the clockwise turning in the drawing is restricted. In addition, as indicated by a dashed line, the swing member 153 abuts against the front end portion 154b, and accordingly, the counterclockwise swinging in the drawing is restricted.

The height of the placement surface 150 is substantially the same as that of the guide surface 155a. When the user moves paper before recording along the placement surface 150 toward the feed/transport path 161, the tip end portion of the paper presses the swing member 153, and the swing member 153 is at the swing position indicated by a dashed line of FIG. 3, and the paper can enter toward the transport roller pair 162 from the gap between the swing member 153 and the guide surface 155a.

On the other hand, a plurality of paper sheets recorded by the recording section 135 and discharged from the discharge/transport path 160 may be placed in a stacked state on the placement surface 150. In such a case, by fixing the swing member 153 at the position indicated by the dashed line, it is possible to restrict a case where the end portions of the stacked paper on the restriction member 151 side collapse and enter the feed/transport path 161.

Figure 4:
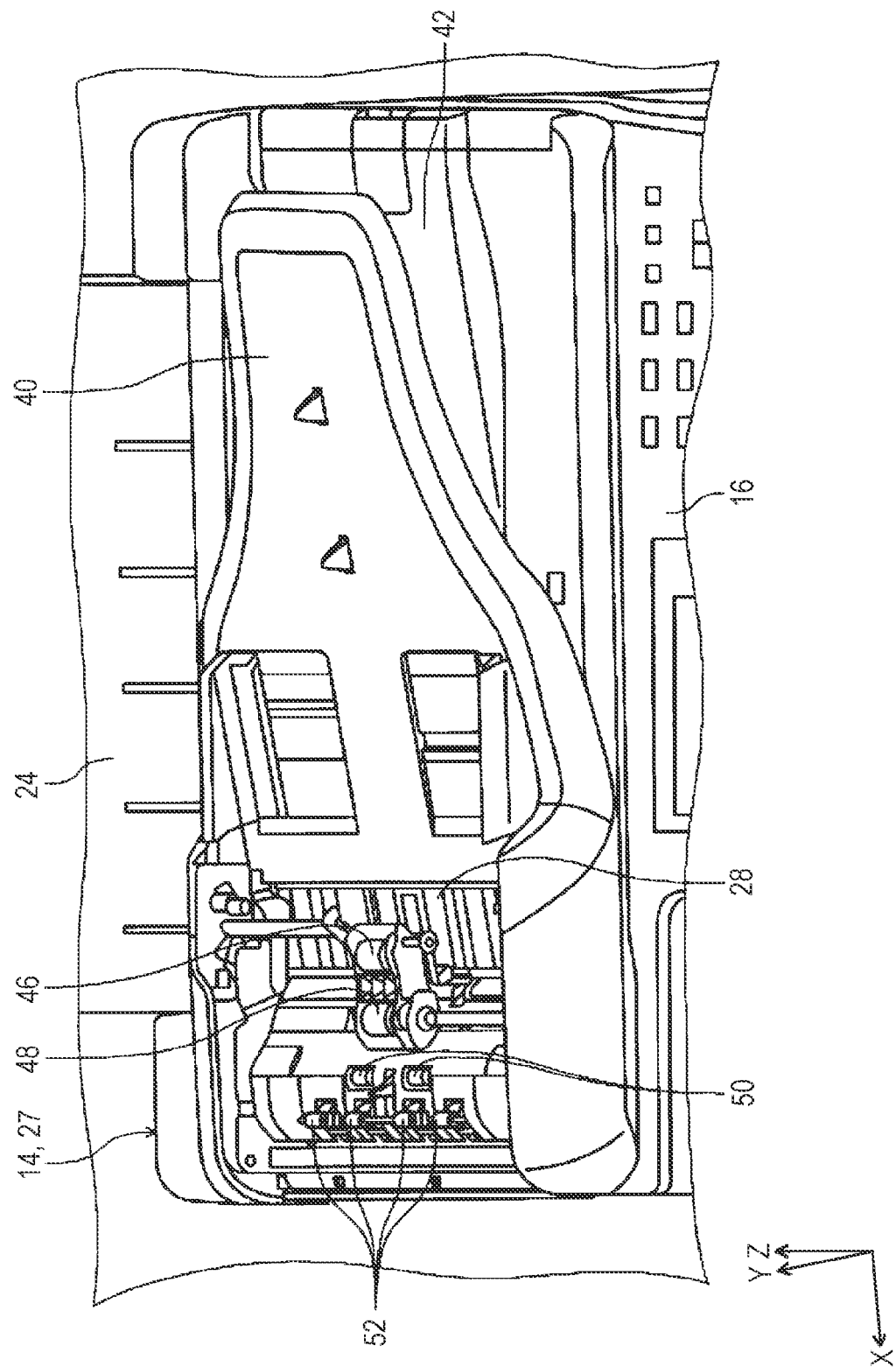
FIG. 4 is a perspective view illustrating an opening/closing body.

Next, the image reading device 14 will be described. FIG. 4 is a perspective view illustrating the ADF section 27 as an opening/closing body, FIG. 5 is a plan view illustrating the arrangement of the image reading surface 34 and the document platen 36, and FIG. 6 is a side sectional view of a drive mechanism section of the ADF section 27.

Figure 6:
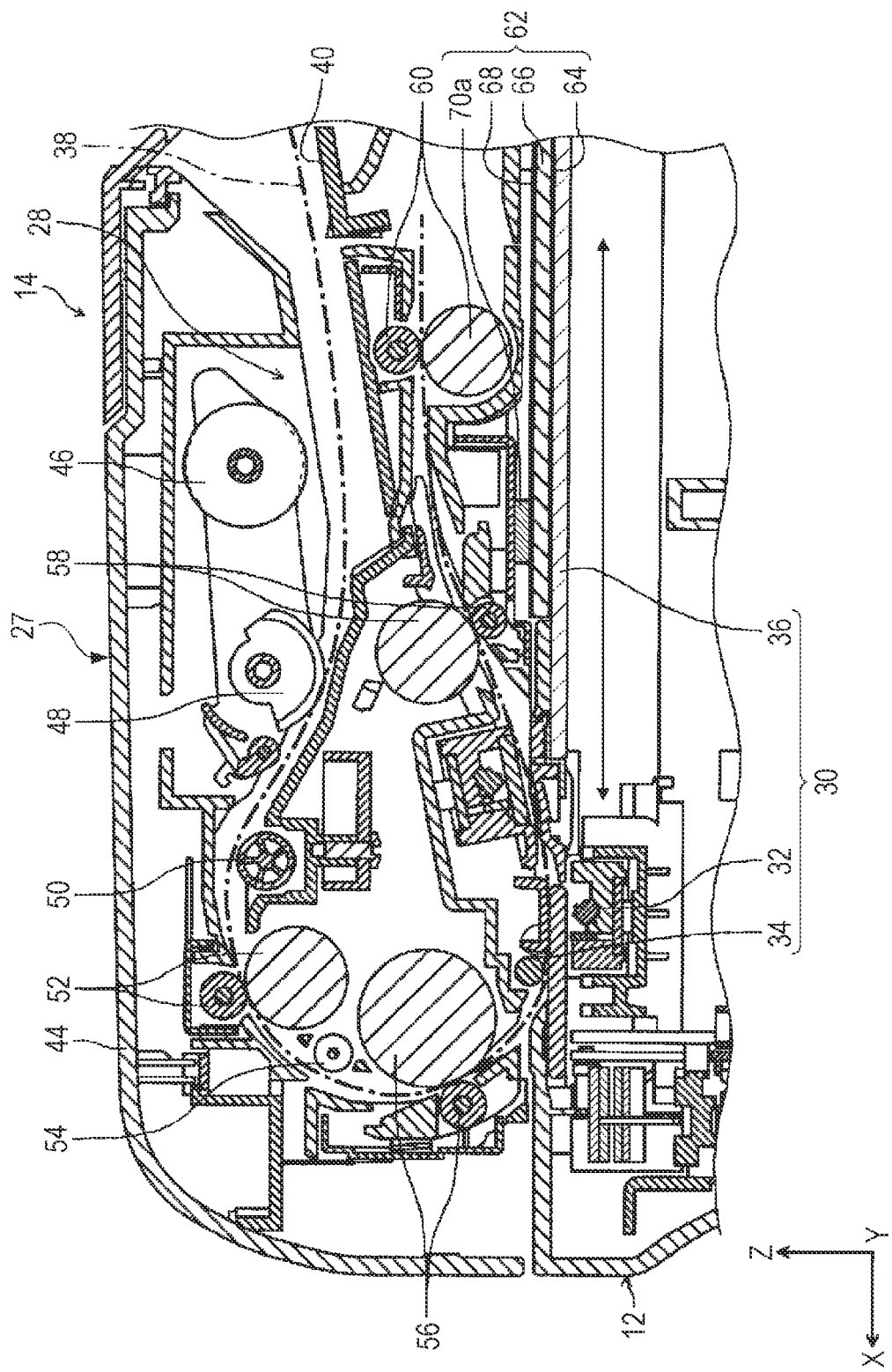
FIG. 6 is a side sectional view of a drive mechanism section for the opening/closing body.

The image reading section 30 in FIG. 6 includes an image reading sensor 32, an image reading surface 34, and a document platen 36. The image reading sensor 32 is configured to be movable in the X-axis direction by a drive mechanism (not illustrated). In addition, the image reading sensor 32 has an optical detector for reading an image extending in the Y-axis direction.

Figure 5:
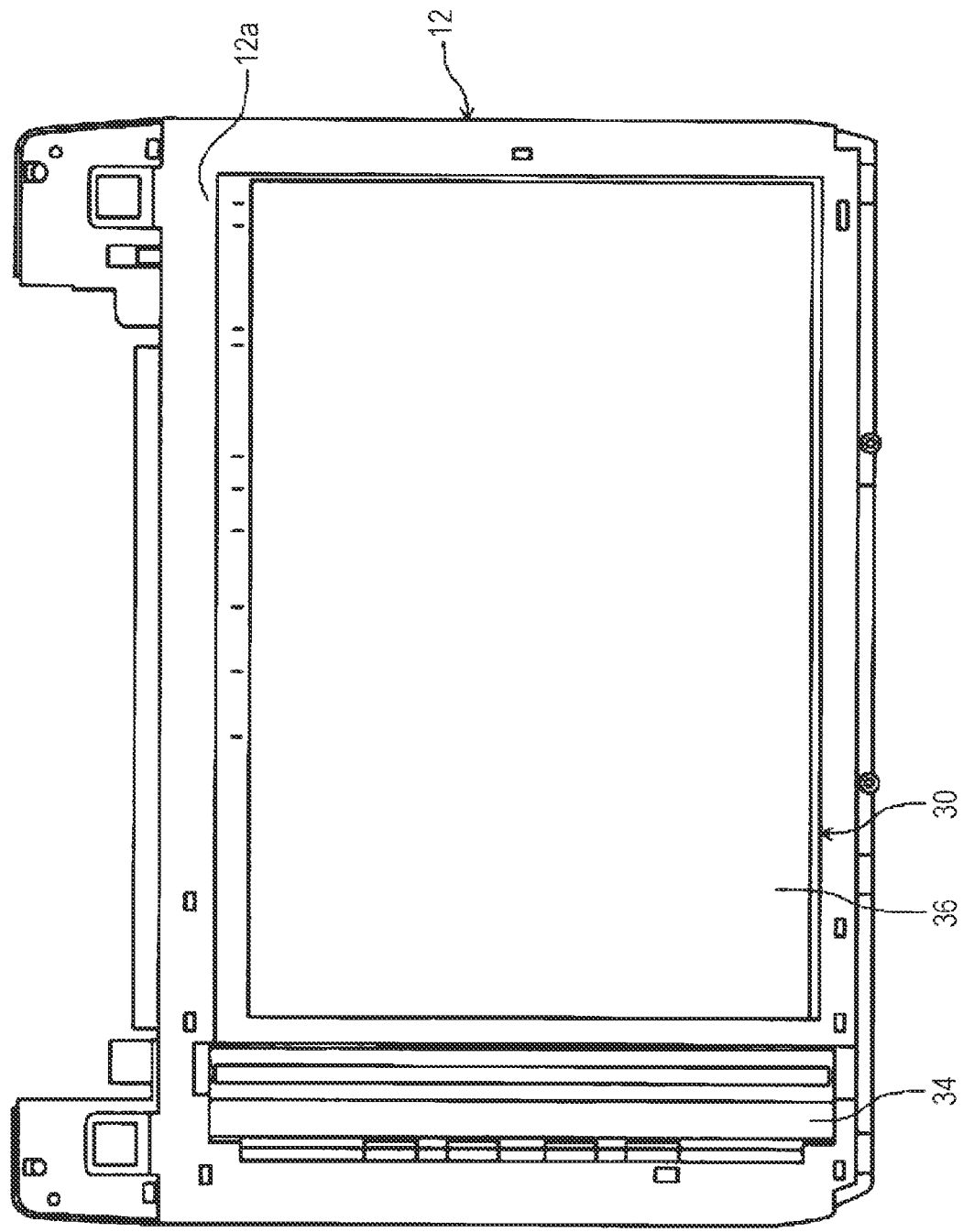
FIG. 5 is a plan view illustrating arrangement of an image reading surface and a document platen.

The image reading surface 34 and the document platen 36 are arranged in parallel on an upper portion 12a of the apparatus main body 12 in FIG. 5. The image reading surface 34 and the document platen 36 are made of a flat and transparent glass plate.

In the document platen 36, both end portions in the Y-axis direction and an end portion on the −X-axis direction side in the X-axis direction are supported by a frame (not illustrated) provided inside the apparatus main body 12.

The image reading surface 34 is provided to face a part of a document transport path 38 (will be described later) when the ADF section 27 is closed with respect to the upper portion of the apparatus main body 12 illustrated in FIG. 5. The length of the image reading surface 34 in the Y-axis direction is set in accordance with the direction intersecting the X-axis direction, in which the document transported on the document transport path 38 is transported, that is, the width direction of the document.

On the other hand, the length of the image reading surface 34 in the X-axis direction is set to be shorter than the length of the document in the transport direction and the document platen 36 because the image reading sensor 32 only needs to be able to read a part of the document which is in contact with the image reading surface 34 when a part of the document transported along the document transport path 38 is in contact with the image reading surface 34. The image reading sensor 32 can read the document through the image reading surface 34 when the document is in contact with the image reading surface 34.

The lengths of the document platen 36 in the X-axis direction and the Y-axis direction are set in accordance with the maximum size of the document that can be read by the apparatus main body 12. The document platen 36 of the multifunction machine 10 of the present embodiment is configured to position and place a standard size document such as A3 and A4 sizes at a predetermined position.

Specifically, in a state where the ADF section 27 is opened with respect to the apparatus main body 12, the document is positioned and placed on the document platen 36, and after the document is placed, the ADF section 27 is closed again with respect to the apparatus main body 12. After that, the image reading sensor 32 is moved in the X-axis direction. As a result, the image reading sensor 32 can read the document placed on the document platen 36, via the document platen 36.

Figure 7:
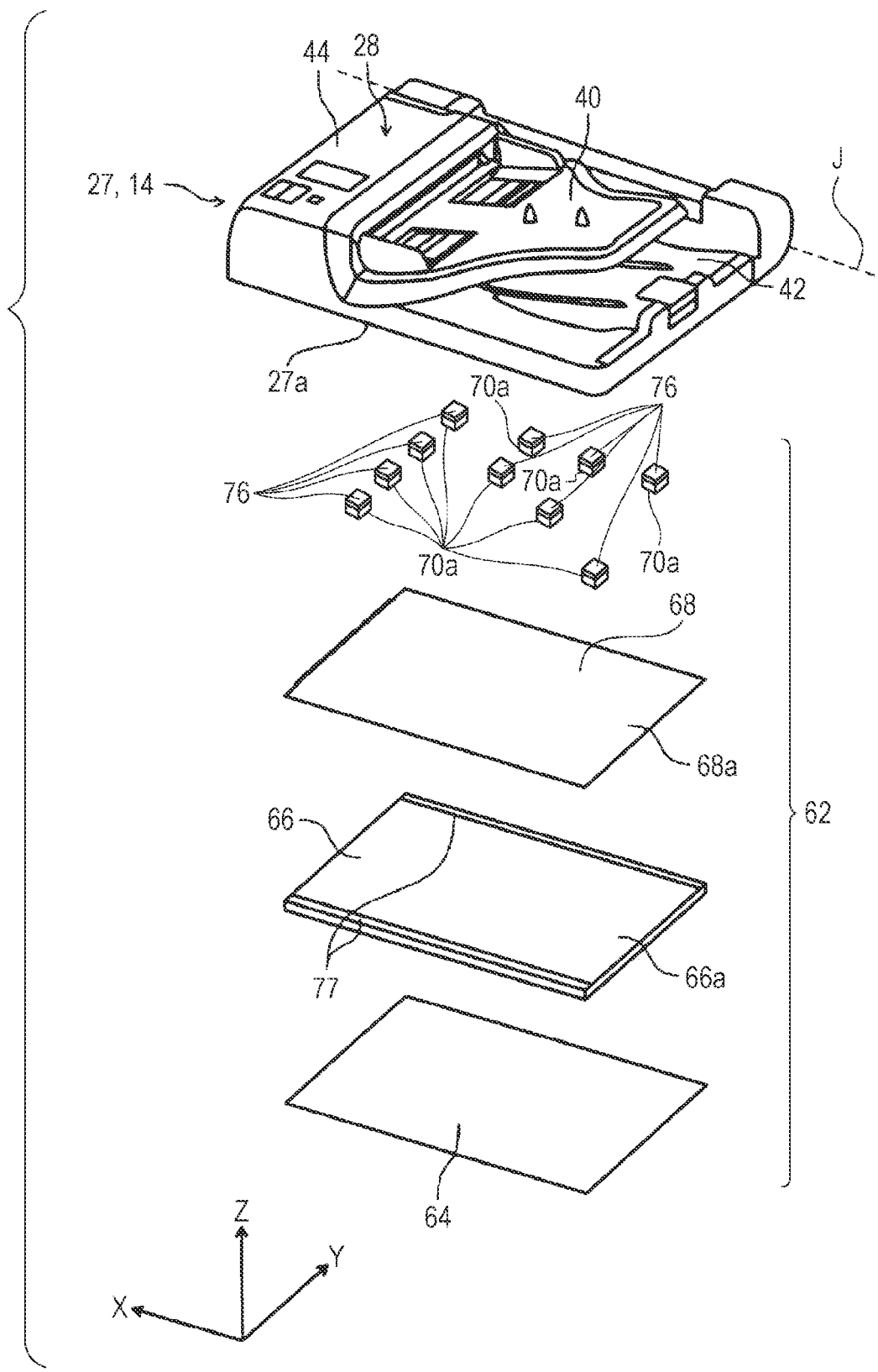
FIG. 7 is an exploded perspective view of a document pressing section attached to a lower portion of the opening/closing body.

Next, a document pressing section will be described. FIG. 7 is an exploded perspective view of a document pressing section 62 attached to the lower portion of the ADF section 27.

The document pressing section 62 includes a sheet-like member 64, an elastic member 66, a reinforcing member 68, and fixing members 70a. The sheet-like member 64 is arranged on the side of the document pressing section 62 facing the document platen 36, that is, the side closer to the document. In the present embodiment, the sheet-like member 64 is made of a polypropylene material with a thickness of 0.2 mm. In addition, the sheet-like member 64 is formed in a size corresponding to the document platen 36.

The elastic member 66 is arranged on the +Z-axis direction side of the sheet-like member 64. In the present embodiment, the elastic member 66 is made of a sponge material with a thickness of 3 mm. The elastic member 66 is also formed to have a size corresponding to the document platen 36, that is, the same size as the sheet-like member 64. The sheet-like member 64 and the elastic member 66 are bonded over the entire surface thereof with an adhesive. An adhesive tape 77 extending in the X-axis direction is attached to the surface of the elastic member 66 on the +Z-axis direction side, that is, both end portions on the upper surface 66a on the Y-axis direction side.

The plate-shaped reinforcing member 68 is arranged on the +Z-axis direction side of the elastic member 66. The reinforcing member 68 in the present embodiment is made of a polycarbonate material having a thickness of 1 mm. The reinforcing member 68 is formed to have a size corresponding to the document platen 36, similarly to the sheet-like member 64 and the elastic member 66. The reinforcing member 68 is attached to the elastic member 66 via adhesive tapes 77 provided on both end portions of the elastic member 66 in the Y-axis direction.

The fixing members 70a are arranged on an upper surface 68a of the reinforcing member 68 on the +Z-axis direction side. In the present embodiment, the fixing member 70a is made of an elastic member such as sponge or urethane. The fixing member 70a is a rectangular parallelepiped having squares of the same size when viewed in the Z-axis direction.

The upper surface of the fixing member 70a on the +Z-axis direction side is attached via an adhesive tape 76 to an area of a lower portion 27a of the ADF section 27 facing the document platen 36. The lower surface of the fixing member 70a on the −Z-axis direction side is attached to the upper surface 68a of the reinforcing member 68 via an adhesive tape (not illustrated).

Figure 8:
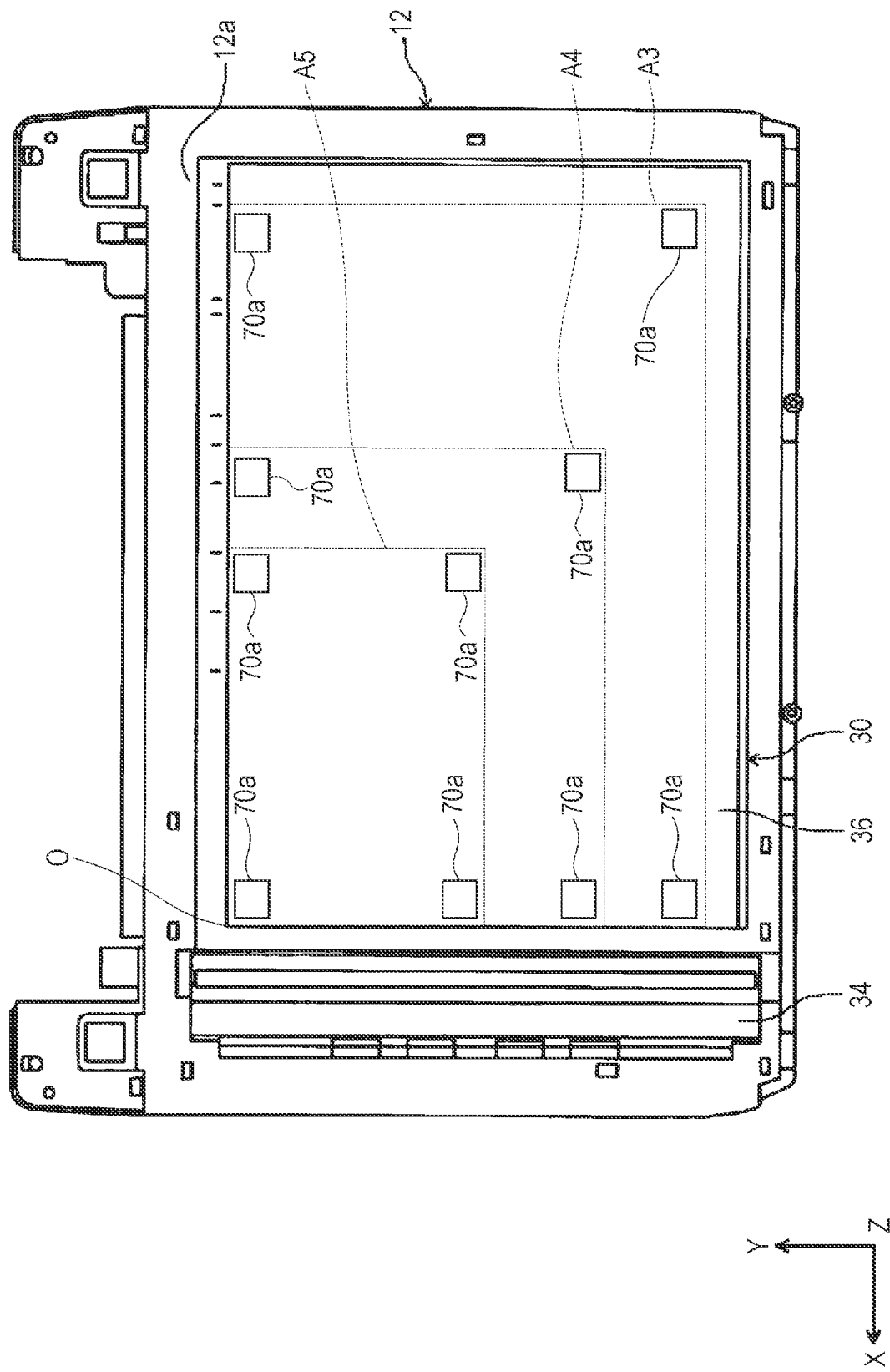
FIG. 8 is a diagram illustrating the arrangement of fixing members with respect to the document platen.

FIG. 8 is a diagram illustrating the arrangement of the fixing members 70a with respect to the document platen 36.

The fixing members 70a are arranged at positions corresponding to the end portions of a standard size document including an A4 size. Here, the fixing members 70a are respectively arranged at the positions corresponding to the end portions of each standard size documents of A3 size, A4 size, and A5 size, which are positioned and placed on the document platen 36 at predetermined positions. The details are described below.

As illustrated in FIG. 8, when the ADF section 27 is closed with respect to the apparatus main body 12 in a state where the standard size A3 document is positioned and placed on the document platen 36, the fixing members 70a are respectively arranged to come to positions corresponding to the end portions of the standard size A3 document placed on the document platen 36. At this time, since the lower portion 27a of the ADF section 27 abuts against the upper portion 12a of the apparatus main body 12, the elastic member 66 and each fixing member 70a of the document pressing section 62 are compressed by the reinforcing member 68 and the ADF section 27.

That is, when the ADF section 27 is closed with respect to the apparatus main body 12, the fixing members 70a are positioned at the four corners of the standard size A3 document placed on the document platen 36. Therefore, the elastic member 66 and each fixing member 70a reliably press the standard size A3 document against the document platen 36, thereby improving the quality of document reading.

Similarly, when the ADF section 27 is closed with respect to the apparatus main body 12 in a state where the standard size A4 or A5 document is positioned and placed on the document platen 36, each fixing member 70a is also arranged to come to positions corresponding to end portions of the standard size A4 or A5 document placed on the document platen 36.

That is, when the ADF section 27 is closed with respect to the apparatus main body 12, each fixing member 70a is positioned at the four corners of the standard size A4 or A5 document placed on the document platen 36. Therefore, the elastic member 66 and each fixing member 70a reliably press the standard size A4 or A5 document against the document platen 36, thereby improving the quality of document reading.

It is preferable that the fixing members 70a be arranged at the farthest position from a reference point O when the standard size document is placed on the document platen 36, that is, at the diagonal position with respect to the reference point O on the standard size document. Here, it is preferable that the reference point O be set respectively at the center positions of each standard size document positioned and placed on the document platen 36.

Regarding the documents other than the above-described standard size A3, A4, and A5 documents, by changing the arrangement of the fixing members 70a, it is possible to reliably press the standard size documents against the document platen 36 and improve the quality of document reading. For example, the fixing members 70a may be arranged at positions corresponding to the four corners of the document having a standard size B4, B5, or the like.

2. Modification Example

Figure 9:
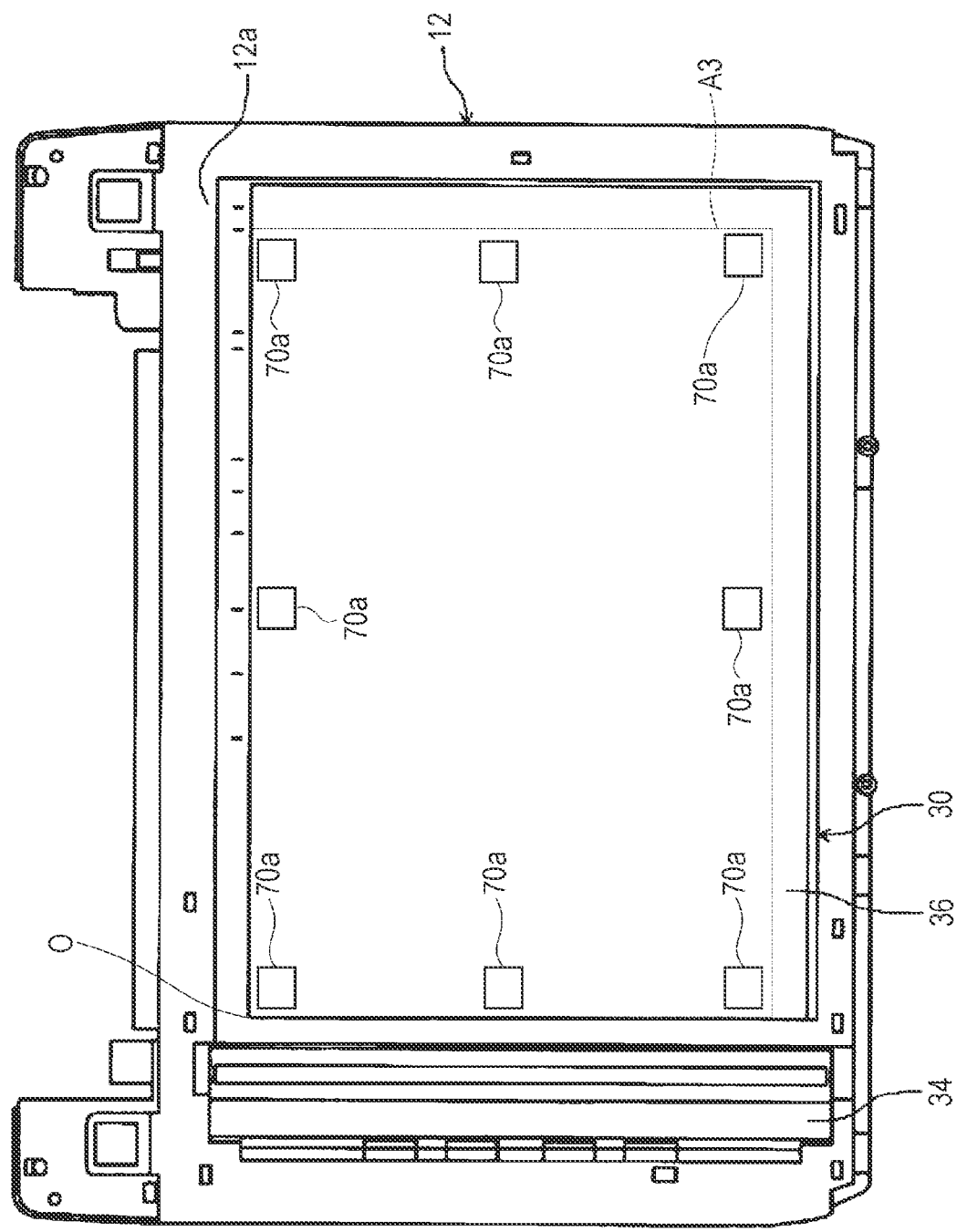
FIG. 9 is a diagram illustrating a modification example of arrangement of the fixing members.

A modification example of the arrangement of the fixing members 70a when the standard size A3 document is placed on the document platen 36 will be described with reference to FIG. 9. FIG. 9 is a diagram illustrating the arrangement of the fixing members 70a corresponding to a state where the standard size A3 document is placed on the document platen 36.

The difference from the present example is that the fixing members 70a are arranged not only at the end portions of the standard size A3 document, but also at positions corresponding to the four sides of the standard size A3 document. By adding the fixing members 70a between the four sides in this manner, the standard size A3 document can be pressed against the document platen 36 more reliably. Therefore, it is possible to improve the quality of reading a standard size A3 document.

In FIG. 9, A3 is exemplified as a standard size document, but the document is not limited thereto. Assuming that other standard size A4 and A5 documents or B4 and B5 documents are positioned and placed on the document platen 36, the fixing members 70a may be arranged at positions corresponding to end portions or sides of each standard size document to be positioned and placed.

The present embodiment and the modification example have been described above, but the present disclosure is not limited to the present embodiment and the modification example, and can be implemented in various aspects without departing from the gist thereof.

The present disclosure includes substantially the same configurations (for example, configurations having the same functions, methods, and results, or configurations having the same objects and effects) as the configurations described in the present embodiment. Further, the present disclosure includes configurations in which non-essential parts of the configuration described in the present embodiment are replaced. In addition, the present disclosure includes configurations that achieve the same operational effects or configurations that can achieve the same objects as those of the configurations described in the present embodiment. Further, the present disclosure includes configurations in which a known technology is added to the configurations described in the present embodiment.

The following contents are derived from the above-described embodiment and modification example.

According to an aspect, there is provided a flat head type image reading device configured to scan a standard size document including an A4 size, the image reading device including: a document pressing section pressing the standard size document and made of an elastic member, in which the document pressing section has fixing members, and the fixing members are arranged at positions corresponding to end portions of the standard size document.

According to this image reading device, a standard size document including an A4 size is fixed to the document platen by the fixing members of the document pressing section, and the quality of image reading can be improved. Further, since the fixing members are arranged at the positions corresponding to the end portions of the standard size document, it is possible to suppress the occurrence of misalignment of the document and improve the quality of image reading.

In the image reading device according to the aspect, the fixing members may be arranged at positions farthest from a reference point of the standard size document.

According to this image reading device, the farther from the reference point, the more likely the document is to be misaligned, and the fixing member arranged at the position corresponding to the farthest position from the reference point of the document can suppress the occurrence of misalignment of the document.

In the image reading device according to the aspect, a plurality of the fixing members may be arranged with respect to the standard size document.

According to this image reading device, by arranging the plurality of fixing members, it is possible to reliably press the entire standard size document, and to improve the quality of image reading.

In the image reading device according to the aspect, the fixing member is made of an elastic member.

According to this image reading device, since the fixing member is made of an elastic member, it is possible to reliably fix a standard size document.

In the image reading device according to the aspect, the fixing members may be arranged at positions corresponding to corners of the standard size document.

According to this image reading device, since the fixing members are arranged at the positions corresponding to corners of the document, it is possible to reliably fix the standard size document.

The fixing members may be arranged at positions corresponding to sides of the standard size document.

According to this image reading device, since the fixing members are arranged at the positions corresponding to corners of the document, it is possible to reliably fix the standard size document.

What is claimed is:

1. A flat head type image reading device configured to scan a standard size document including an A4 size, the image reading device comprising:
    a document pressing section pressing the standard size document and made of an elastic member, wherein
    the document pressing section has fixing members,
    the fixing members are arranged at positions corresponding to end portions of the standard size document, and
    the fixing members include
        a plurality of first fixing members arranged at uneven intervals relative to each other in a first direction of the document pressing section, and
        a plurality of second fixing members arranged at uneven intervals relative to each other in a second direction of the document pressing section, the second direction being perpendicular to the first direction.

2. The image reading device according to claim 1, wherein
    the fixing members are arranged at positions farthest from a reference point of the standard size document.

3. The image reading device according to claim 1, wherein
    a plurality of the fixing members are arranged with respect to the standard size document.

4. The image reading device according to claim 1, wherein
    the fixing member is made of an elastic member.

5. The image reading device according to claim 1, wherein
    the fixing members are arranged at positions corresponding to corners of the standard size document.

6. The image reading device according to claim 1, wherein
    the fixing members are arranged at positions corresponding to sides of the standard size document.

* * * * *